US012335486B2

(12) United States Patent
Ram et al.

(10) Patent No.: US 12,335,486 B2
(45) Date of Patent: Jun. 17, 2025

(54) CONTENT-AWARE, MACHINE-LEARNING-BASED RATE CONTROL

(71) Applicant: Mellanox Technologies, Ltd., Yokneam (IL)

(72) Inventors: Eshed Ram, Nofit (IL); Dotan David Levi, Kiryat Motzkin (IL); Assaf Hallak, Tel Aviv (IL); Shie Mannor, Haifa (IL); Gal Chechik, Ramat Hasharon (IL); Eyal Frishman, Hod Hasharon (IL); Ohad Markus, Haifa (IL); Dror Porat, Haifa (IL); Assaf Weissman, Moreshet (IL)

(73) Assignee: Mellanox Technologies, Ltd., Yokneam (IL)

( * ) Notice: Subject to any disclaimer, the term of this patent is extended or adjusted under 35 U.S.C. 154(b) by 101 days.

(21) Appl. No.: 18/096,428

(22) Filed: Jan. 12, 2023

(65) Prior Publication Data

US 2024/0244225 A1      Jul. 18, 2024

(51) Int. Cl.
  *H04N 19/147* (2014.01)
  *H04N 19/124* (2014.01)
  *H04N 19/172* (2014.01)

(52) U.S. Cl.
  CPC ......... *H04N 19/147* (2014.11); *H04N 19/124* (2014.11); *H04N 19/172* (2014.11)

(58) Field of Classification Search
  CPC .. H04N 19/147; H04N 19/124; H04N 19/172; H04N 19/176
  See application file for complete search history.

(56) References Cited

U.S. PATENT DOCUMENTS

| 11,729,387 B1 | 8/2023 | Khsib et al. |
| 2015/0223777 A1 | 8/2015 | Rasoulian et al. |
| 2019/0014332 A1* | 1/2019 | Song ............... H04N 19/80 |

(Continued)

FOREIGN PATENT DOCUMENTS

| CN | 101808244 B | 3/2012 |
| CN | 115438263 A | 12/2022 |

OTHER PUBLICATIONS

Chen et al., "Reinforcement Learning for HEVC/H.265 Frame-level Bit Allocation", 2018 IEEE 23rd International Conference on Digital Signal Processing (DSP), 5 pages, Nov. 19, 2018.

(Continued)

*Primary Examiner* — Kyle M Lotfi
(74) *Attorney, Agent, or Firm* — Lowenstein Sandler LLP

(57) ABSTRACT

A system includes a processing device to receive video content, metadata related to the video content, and a target bit rate for encoding the video content. The processing device further detects a content type of the video content based on the metadata and encodes hardware to perform frame encoding on the video content. The system further includes a controller coupled between the processing device and the encoding hardware. The controller is programmed with machine instructions to generate first QP values on a per-frame basis using a frame machine learning model with a first plurality of weights. The first plurality of weights depends at least in part on the content type and the target bit rate. The controller further provides the first QP values to the encoding hardware for rate control of the frame encoding.

20 Claims, 10 Drawing Sheets

(56) References Cited

U.S. PATENT DOCUMENTS

| | | | |
|---|---|---|---|
| 2019/0028745 A1 | 1/2019 | Katsavounidis | |
| 2019/0289296 A1 | 9/2019 | Kottke et al. | |
| 2022/0021887 A1 | 1/2022 | Banerjee et al. | |
| 2022/0116611 A1 | 4/2022 | Yedidi et al. | |
| 2023/0319285 A1* | 10/2023 | Shanmugam | H04N 19/136 |
| 2023/0319292 A1* | 10/2023 | Li | H04N 19/192 |
| | | | 375/240.02 |
| 2023/0336739 A1 | 10/2023 | Gu et al. | |

OTHER PUBLICATIONS

Ho et al., "A Dual-Critic Reinforcement Learning Framework for Frame-level Bit Allocation in HEVC/H.265", 2021 Data Compression Conference (DCC), pp. 13-22, Apr. 5, 2021.

Hu et al., "Reinforcement Learning for HEVC/H.265 Intra-Frame Rate Control", 2018 IEEE International Symposium on Circuits and Systems (ISCAS), 5 pages, May 27, 2018.

Mandhane et al., "MuZero with Self-competition for Rate Control in VP9 Video Compression", arXiv preprint arXiv:2202.06626, 20 pages, Feb. 14, 2022.

Mao et al., "Neural Rate Control for Video Encoding using Imitation Learning", arXiv preprint arXiv:2012.05339, 13 pages, Dec. 9, 2020.

Zhou et al., "Rate Control Method Based on Deep Reinforcement Learning for Dynamic Video Sequences in HEVC", IEEE Transactions on Multimedia, vol. 23, pp. 1106-1121, 2021.

* cited by examiner

700

Receive video content, a quality metric, and a target bit rate for encoding the video content.
710

Generate first QP values on a per-frame basis using a frame machine learning model with a first plurality of weights, where the first plurality of weights depends at least in part on the quality metric and the target bit rate.
720

Provide the first QP values to encoding hardware for rate control of frame encoding by the encoding hardware.
730

*Generate second QP values on a per-sub-frame basis using a sub-frame machine learning model with a second plurality of weights, which depends at least in part on the quality metric and the target bit rate.*
740

*Provide the second QP values to the encoding hardware for use in rate control when encoding respective sub-frames of the video content.*
750

FIG. 7

CONTENT-AWARE, MACHINE-LEARNING-BASED RATE CONTROL

TECHNICAL FIELD

At least one embodiment pertains to processing resources used to perform and facilitate video encoding of video content. For example, at least one embodiment pertains to rate control that is content-aware and based on machine learning for video encoders.

BACKGROUND

Video encoders include a pipeline of staged video processing and encoding, which includes compression that enables video to be stored for later access or to be streamed directly or over a network (e.g., the Internet) to a destination video device. The video device thus also includes or is coupled with a decoder that decodes the video stream for playback. Optimizing video compression can increase access and quality of video content to users and reduce energy use and costs as online video streaming grows in popularity.

One way of increasing streaming quality is through rate control (RC) of a video-encoding pipeline. Rate control can be understood as a decision-making algorithm that dictates the number of bits allocated for encoding a frame during a video compression process. This allocation of bits via RC considers how compressible a frame is (or that of a region in a frame) and how much quality (e.g., distortion) will be impacted if fewer bits are allocated for that frame (or frame region). Rate control is not part of the encoding standard and thus varies much across streaming platforms and providers. Some encoders, for example, employ statistical heuristics to estimate a quantization parameter (QP) that controls a bitrate-distortion trade-off.

BRIEF DESCRIPTION OF DRAWINGS

Various embodiments in accordance with the present disclosure will be described with reference to the drawings, in which:

FIG. 7 is a flow diagram illustrating a method for optimizing rate control through the disclosed machine learning models regardless of a quality metric selected by a video streaming source device in accordance with some embodiments.

DETAILED DESCRIPTION

Figure 1:
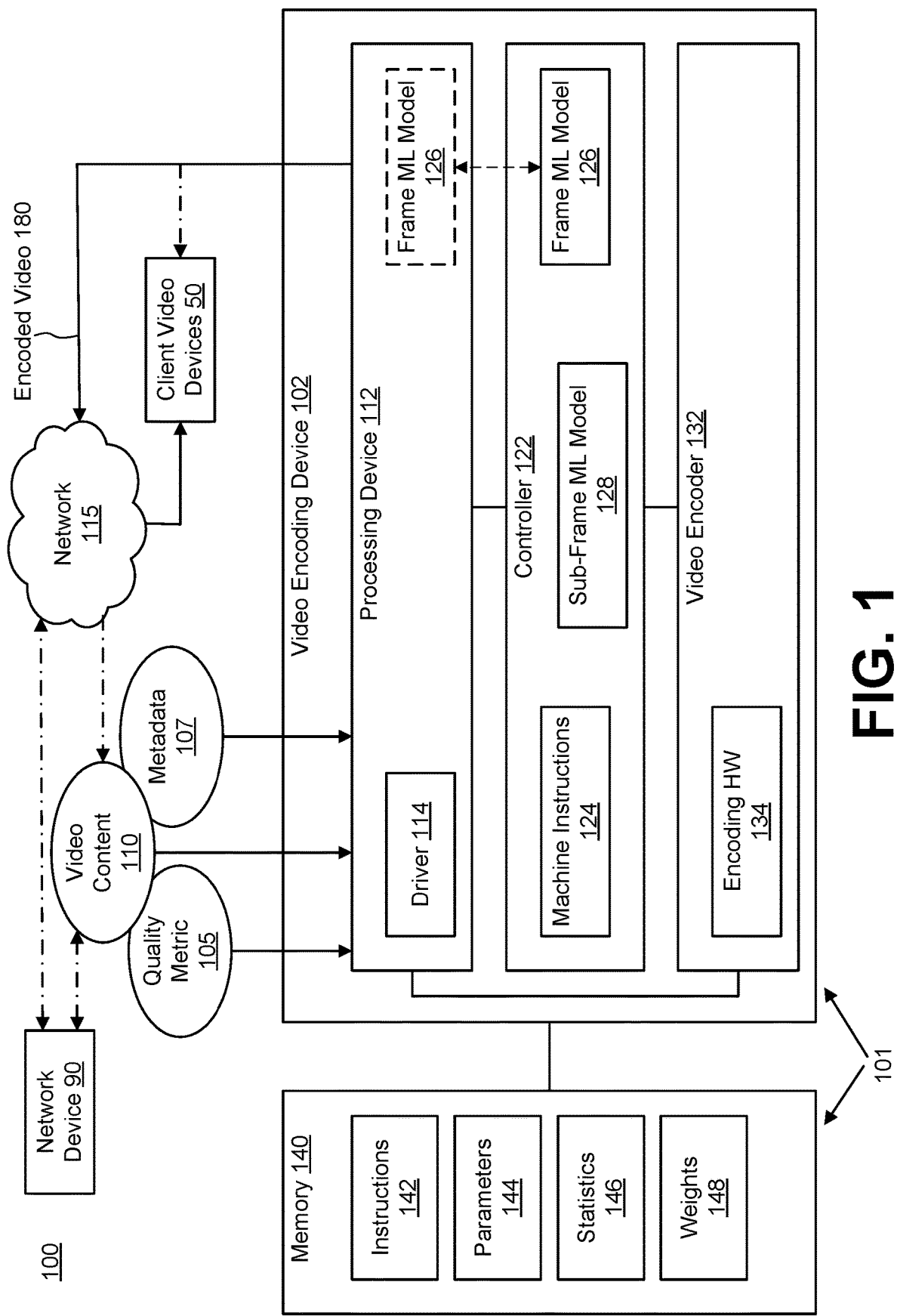
FIG. 1 is a block diagram of a video encoding system that includes a video encoding sub-system for employing RC-based machine learning in accordance with some embodiments.

As described above, rate control (RC) is the main portion of a video compression algorithm that dictates the number of bits allocated for encoding a frame during a video compression process. To control the bitrate-distortion trade-off, the RC algorithm determines the value of a quantization parameter (QP) that the video encoder will use in encoding a particular portion of video content. Higher values of QP lead to coarser quantization and to fewer bits allocated to a frame. Lower values of QP lead to finer quantization and to more bits allocated to a frame. Saving bits by increasing QP values degrades the video quality.

Additionally, rate control implementations tend to be tightly coupled with the specific quality metric being used, and when the quality metric employed is changed, the video encoder needs to be programmed to implement a new RC algorithm, which has to be redesigned specifically for that quality metric. This is an inefficient requirement that demands significant additional work for such redesigns. Video quality metrics are algorithms designed to predict how actual viewers would gauge video quality. These metrics are used for a range of activities, from comparing codecs and different encoding configurations to assisting in production and live quality of experience (QoE) monitoring. Video quality can be evaluated objectively (e.g., by mathematical models) or subjectively (e.g., by asking users to rate video quality).

In certain video encoders, there are few modes to dictate bitrate (or setting the rate-control mode). Usually, a user (e.g., streaming video receiver or other client video device) specifies the target bitrate according to system constraints of the streaming video receiver and the size of the window within which this target bitrate is enforced. For example, an enforced constant bitrate for less than one second is considered a Constant Bit Rate mode (CBR). In contrast, in a Variable Bit Rate (VBR) mode, the target bitrate is averaged over a larger window, e.g., of many seconds. There are also modes in which the bitrate is the second important factor, and the encoder target is to preserve quality while trying to minimize bitrate. Rate control, therefore, can be implemented as an algorithm that works to optimize the bitrate-quality trade-off for each specific mode, i.e., maximize quality while satisfying bitrate constraints or minimize bitrate while satisfying quality constraints.

Tuning an RC algorithm that drives the compression process in video encoding can either result in inefficiency or poor quality if done incorrectly. For example, if tuning the compression to more bits than a video encoder could optimally use, the video encoder will have an increased bit stream and the same quality, which means that the video encoder is inefficient. If tuning overly aggressively, the video encoding will result in poor quality in which the human eye sees many artifacts. Thus, developing and/or tuning an RC algorithm presents particular challenges and risks of inefficiency and/or poor quality in video encoding.

Aspects and embodiments of the present disclosure address these deficiencies and challenges in RC-related tuning by training one or more machine learning (ML) algorithms that generate a number of weights once the ML algorithms are optimized to a desired quality and efficiency level, for example. This training can be performed knowing the content type, quality metric, and/or target bit rate (among other parameters) and thus the weights can be specific to particular parameters or characteristics of the video content being encoded. In this way, according to some embodiments, the generated weights are provided to a video encoding device as a starting point for a ML model that implements a frame (or sub-frame) machine learning model to be applied to real-time video encoding. In some embodiments, each of these machine learning models is generated by training one or more neural networks as a reinforcement learning (RL) model that includes one or more states that are updated based on maximizing a reward function. For example, in at least one embodiment, maximizing the reward function minimizes bitrate deviation while maximizing a quality metric of the frame (or sub-frame) encoding.

Encompassing further aspects and embodiments, when the video encoding device receives raw video content to be video encoded in real-time, the video encoding device can also receive or determine model parameters based on the encoding that is going to be performed, e.g., based on a quality metric and/or a video content type. The video encoding device can then retrieve the multiple weights that were previously determined for that type of video content, for a particular quality metric, and/or a particular target bitrate, and provide those weights to the neural network that implements the frame (or sub-frame) machine learning model.

In various embodiments, the video encoding can be implemented within a video encoding device that includes a processing device adapted to execute instructions (e.g., software code), a controller adapted to execute machine code (e.g., firmware), and a video encoder. In at least one embodiment, the video encoder is implemented in hardware. In other embodiments, the video encoder is implemented in firmware or other machine-programmed logic.

In at least some embodiments, the video encoding device (e.g., the processing device or the controller) receives, from the video encoder while encoding the video content, frame statistics based on one or more encoded frames (or downscaled encoded frames) of the video content corresponding to a current frame. "Corresponding to" in this context can mean, for example, being adjacent, neighboring frames, frames within the same block, frames within the same sub-block, or the like portion of the video content related to the current frame. In various embodiments, frame statistics include at least one of block-related metadata, frame-related metadata, bit budget information, or complexity motion information, listed by way of example.

In these embodiments, the video encoding device can then generate a QP value for the current frame using the frame machine learning model that was previously discussed. The frame machine learning model can include states that depend on the frame statistics, for example. The video encoding device can further update the states based on at least one of total bits of encoding, a target bitrate, or a current group of pictures (GOP) of the video content. The video encoding device can then provide the QP value to the video encoder for rate control of the frame encoding of the current frame. As this process is iteratively performed on a per-frame basis (frame statistics leading to a QP value for a frame that leads to generating additional statistics for the next frame), the video encoding device streams the encoded video over a network, e.g., to a destination such as a streaming video receiver. Alternatively, the video encoding device stores the video content (e.g., in a file in memory) for later access or directly provides the encoded video to other client video device of individual users without streaming.

In this way, the RC-generated QP values for encoding are customized (e.g., via customized states) according to the statistics of related frames, a target bit rate, a GOP, and the like, and by the neural network that is configured with weights based on one or more of the model parameters. As will be discussed in more detail, this RC algorithmic approach can also be applied to sub-frames using a separately trained sub-frame machine learning model, which again, can also be an RL machine learning model.

Advantages of the present disclosure include but are not limited to a video encoding device that can flexibly take video content of any content type and/or associated with a specific quality metric and target bitrate, and in real-time, employ a customized machine learning model that will generate the QP values that drive the rate control for encoding the video content on a per-frame and per-sub-frame basis. Because frame and sub-frame ML models are employed in real-time, redesigning RC algorithms for differing content type, quality metrics, and bitrates are avoided. Other advantages will be apparent to those skilled in the art of video encoding discussed hereinafter.

FIG. 1 is a block diagram of a video encoding system 100 (or device) that includes a video encoding sub-system 101 for employing RC-based machine learning in accordance with some embodiments. In various embodiments, a network device 90 provides video content 110 to the encoding sub-system 101 either directly (e.g., a wired connection) or over a network 115 (e.g., wireless or over a wired network). In some embodiments, the video encoding sub-system 101 is a part of a video streaming server (e.g., of a video streaming platform) that streams, on-demand, video content to many users at the same time at client video devices 50. In embodiments, the video encoding sub-system 101 is a part of or coupled to the network device 90, which can be a server or some other video streaming device such as a headend, a switch, a hub, or the like. The client video devices 50 can be any streaming video receiver at a network edge that requested the video content, and to which is delivered the requested video content encoded by the video encoding sub-system 101. The encoding typically includes compression that enables preserving as high a quality of the video content but also reduces the size of streamed packets, enabling faster streaming of the video content over the network 115. In some embodiments, the client video devices 50 are directly coupled to source device that is providing and/or encoding the video content.

In some embodiments, the video content 110 may be associated with a quality metric 105, either based on a particular source of the streaming content (as associated with a way to quantify a quality of encoded video content) and/or that is based on a user requirement. As discussed, video quality metrics are algorithms designed to predict how actual viewers would gauge or rank video quality. These metrics are used for a range of activities, from comparing codecs and different encoding configurations, to assisting in production and live QoE monitoring. Video quality can be evaluated objectively (e.g., by mathematical models) or subjectively (e.g., by asking users to rate video quality), and thus video metrics may vary in objective and subjective ways, making it difficult to know how to adjust RC algorithms based on a given quality metric. For example, some quality metrics predict subjective video quality based on a reference and a distorted video sequence. The quality metric 105 can also be used to evaluate the quality of different video codecs, encoders, encoding settings, or transmission variants. Because a particular quality metric 105 may be one of the objectives or parameters that drives video encoding, tuning an RC algorithm (to include training a machine learning model) may include taking into consideration the quality metric being associated with the video content.

In at least some embodiments, the video content 110 includes metadata 107, which includes the quality metric 105 and/or a content type. For example, related to the latter, the metadata 107 can include one or more tags associated with the video content. Thus, the video encoding sub-system may detect the one or more tags within the metadata 107 that are indicative of the content type. Further, tuning an RC algorithm (to include training a machine learning model) may also depend on the detected content type, as will be discussed in more detail. Content type, for example, may refer to different types of video content, such as streaming video from particular platforms, day parts, natural video gaming, synthetic telepresence, and the like.

With more particularity, and in at least some embodiments, the video encoding sub-system 101 includes a video encoding device 102 and a memory 140. In these embodiments, the video encoding device 102 includes a processing device 112 that executes instructions (e.g., higher-level program code), a controller 122 (e.g., that executes lower-level machine instructions, also referred to as firmware or microcode), and a video encoder 132. In various embodiments, the video encoding device 102 is incorporated within one or more larger processing systems, such as a central processing unit (CPU), a graphics processing unit (GPU), and/or a data processing unit (DPU). In embodiments, the encoded video content is stored in one or more files in the memory 140 to be accessed by or provided to the client video devices 50 at a later time.

In at least some embodiments, the video encoder 132 is implemented at least in part with encoding hardware 134 (e.g., is a hardware video encoder), which can include hardware logic, a programmed processor such as a programmed field-programmable gate array (FPGA), microcontroller, specialized system-on-a-chip, or the like, or a combination thereof. Implementing the video encoder 132 in hardware can enable high-resolution video sequences and high frame rates in the encoded video. Because training a good ML model using a neural network (NN) takes millions of frames, the hardware also helps to speed up the NN training. In various embodiments, the video encoder 132 implements one or more codecs, such as High-Efficiency Video Coding (HEVC), A0 Media Video 1 (AV1), H264 (also known as MPEG-4 or Advance Video Coding), and/or VP9 (and open, royalty-free coding format developed Google®). A codec is a device, hardware (as disclosed herein), or program that compresses data to enable faster transmission and decompresses received data.

In some embodiments, the memory 140 is coupled to and accessible by the video encoding device 102. In some embodiments, the memory 140 is located on the video encoding device 102, e.g., on die of a chip that instantiates the video encoding sub-system 101. The memory 140 may be adapted to store instructions 142, to include program code and/or machine instructions, parameters 144, to include model parameters, statistics 146 generated by the video encoder 132, and weights 148 associated with a machine learning model, e.g., which can be instantiated using a neural network (NN).

In some embodiments, the processing device 112 includes a driver 114 to interact with the controller 122 and the video encoder 132. In embodiments, the processing device 112 optionally includes or is configured to execute a frame machine learning model 126. The controller 122, as mentioned, is adapted to execute machine instructions 124, as well as includes or is adapted to execute the frame machine learning model 126 and a sub-frame machine learning model 128. In embodiments, each of the frame machine learning model 126 and the sub-frame machine learning model 128 is a frame reinforcement learning model that is instantiated within a neural network. In some embodiments, the driver 114 executes one or more application programming interfaces (APIs) to provide access, by the network device 90 and the client video devices 50, to particular codecs executed by the video encoder 132. Each of the components of the video encoding sub-system 101, and in particular the video encoding device 102, will be described in more detail hereinafter.

Figure 2A:
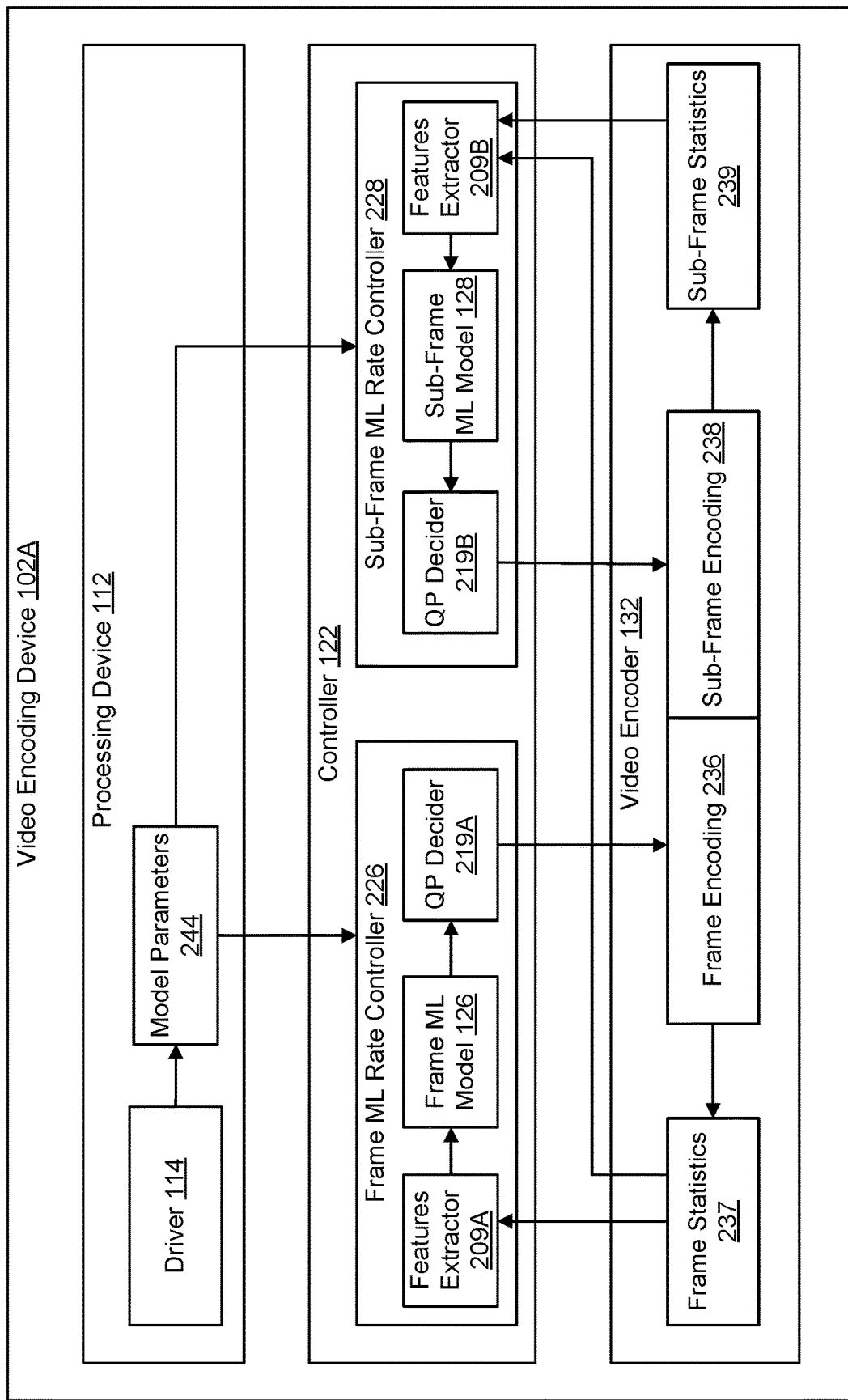
FIG. 2A is a block diagram of a video encoding device of the video encoding sub-system in accordance with at least one embodiment.

FIG. 2A is a block diagram of a video encoding device 102A of the video encoding sub-system 101 in accordance with at least one embodiment. The video encoding device 102A may be a variation of the video encoding device 102 of FIG. 1. In this embodiment, the processing device 112 executes the driver 114 to generate multiple model parameters 244 based on encoding that is going to be performed on the video content 110. In some embodiments, the model parameters 244 depend on the quality metric objective and content type stored in association with the driver 114, e.g., with reference to implementing a pre-trained ML model. The processing device 1112 may then load the model parameters, and in particular any model parameters that have changed, to the controller 122 at the beginning of the encoding process. The controller 122 may use the model parameters to determine the weights used by the frame (and sub-frame) machine learning model, as will be discussed in more detail.

In the embodiment of FIG. 2A, the controller 122 includes a frame ML rate controller 226 and a sub-frame ML rate controller 228 to generate QP values for controlling per-frame RC of the video encoder 132. For example, in various embodiments, the video encoder 132 includes a frame encoding logic 236 that encodes frames using frame QP values generated by the frame RL rate controller 226. Further, in embodiments, the video encoder 132 includes sub-frame encoding logic 238 that encodes sub-frames using sub-frame QP values generated by the sub-frame ML rate controller 228. In some embodiments, the video encoder 132 generates frame statistics 237 based on one or more encoded frames of the video content 110 corresponding to a current frame. In these embodiments, the video encoder 132 generates sub-frame statistics 239 based on one or more encoded sub-frames of the video content 110 corresponding to a current sub-frame. The term "corresponding to" here can mean, for example, being adjacent, neighboring frames, frames within the same block, frames within the same sub-block, or the like portion of the video content that contains or is related to the current frame.

A sub-frame is a subdivision of a frame that includes information that enables various pieces of logic (hardware, firmware, software, or a combination thereof) to synchronize together when processing the video content. Sub-frames are generally considered to equal one-one hundredth (1/100) of a frame, although other fractions are envisioned. There is no actual component this small in a timecode word, but the sub-frame information can be interpreted by monitoring the phase sync of the individual bits making up the signal. In some devices, a slightly coarser resolution of 1/80th (or a similar portion) of a frame is used. While often referred to as a sub-frame, this 1/80th of a frame is more accurately known as a bit, as it refers to any of the bits of individual data transmitted as part of a standard timecode word. There are also other derivations of the sub-frame in use in varying embodiments.

use various algorithms, such as motion estimation, to construct a frame that describes the differences. This allows a decoder (e.g., in the client video devices 50) to use the reference frame plus the differences to construct the desired frame.

In these embodiments, the frame ML model 126 is the frame machine learning model that has been pre-trained by the video encoding device 102A, as will be discussed in more detail with reference to FIG. 6. As discussed, the frame ML model 126 may be an RL machine learning model. In at least some embodiments, the frame ML model 126 generates an output value using states that depend on the frame statistics 237 and weights that are based on the model parameters 244. In these embodiments, QP decider 219A generates a first QP value for the current frame based on the output value from the frame ML model 126. The controller

TABLE 1

| Block-Related Metadata | Frame-Related Metadata | Bit Budget Info. | Complexity Motion Info. |
|---|---|---|---|
| Average (over blocks) of QP of the previous frame | Previous frame size in the bit stream | Fraction of motion-vector bits in the bit stream | Accumulated bitrate error of current sequence |
| Average (over blocks) of QP of the same type of the previous frame | Reconstructed frame Peak Signal-to-Noise Ratio (PSNR) | Fraction of texture bits in the bit stream | Next frame includes a complexity activity (motion-related)? |
| Fraction of P blocks | Reconstructed frame Structural Similarity Index Measure (SSIM) | Fraction of miscellaneous bits in the bit stream | Residual Frame Info. |
| Fraction of I blocks | Temporal distance of the last two P-frames | Percentage of processed video in the current sequence | Motion Estimation |
| Fraction of Skip Blocks | QPs of the last two P-frames | — | — |
| — | Next frame an I-frame? | — | — |
| — | Next frame a P-frame? | — | — |
| — | Next frame a B-frame? | — | — |

In these embodiments, the frame ML rate controller 226 includes or implements a feature extractor 209A, a frame ML model 126, and a QP decider 219A to generate QP values, one QP value per frame that is provided to the video encoder 132. The features extractor 209A can receive or extract the frame statistics 237 generated by the video encoder 132 and which can be associated with each frame that is encoded by the frame encoding logic 236. The frame statistics 237 may be based on one or more encoded frames of the video content 110 corresponding to a current frame. In various embodiments, the statistics include one or a combination of block-related metadata, including QP-related metadata, frame-related metadata, bit budget information, and complexity motion information. Table 1 illustrates examples of these frame statistics, although others are envisioned. In Table 1, the I-frame stands for "Intra-frame," the P-frame stands for "Predicted Frame," and the B-frame stands for "Bi-directional," meaning can refer to a frame that occurs both before and after a frame, as it is generally known in the art of video compression.

Related to complexity motion information in Table 1, during encoding, a residual frame is formed by subtracting a reference frame from a desired (or target) frame. This difference is known as the error or residual frame. The residual frame normally has less information entropy due to nearby video frames having similarities and, therefore, may require fewer bits to compress. The video encoder 132 may 122 can then provide the first QP value to the video encoder 132 for rate control of the frame encoding of the current frame. In some embodiments, the frame ML rate controller 226 updates the states of the frame ML model 126 based on at least one of the total bits of encoding, a target bitrate, or a current group of pictures (GOP) of the video content. In these embodiments, the video encoder 132 encodes the current frame using the first QP value.

In these embodiments, the sub-frame ML rate controller 228 includes or implements a feature extractor 209B, a sub-frame ML model 128, and a QP decider 219B to generate QP values, one QP value per sub-frame that is provided to the video encoder 132. The features extractor 209B can receive or extract the sub-frame statistics 239 generated by the video encoder 132 and which can be associated with each sub-frame that is encoded by the frame encoding logic 236. The sub-frame statistics 239 may be based on one or more encoded sub-frames of the video content 110 corresponding to a current sub-frame. The term "corresponding to" here can mean, for example, being adjacent, neighboring sub-frames, sub-frames within the frame or the same block, sub-frames within the same sub-block, or the like portion of the video content that is related to the current sub-frame. In various embodiments, the sub-frame statistics 239 include one or a combination of block-related metadata, including QP-related metadata, sub-frame-related metadata, bit budget information, and complexity motion information. Table 2 illustrates examples of these frame statistics, although others are envisioned.

TABLE 2

| Block-Related Metadata | Frame-Related Metadata | Bit Budget Info. | Complexity Motion Info. |
| --- | --- | --- | --- |
| Previous block size in the bit stream | Fraction of P blocks processed in the current frame | Fraction of motion-vector bits up to the current block | Accumulated bitrate error from the target frame rate |
| QP of the previous block | Fraction of I blocks processed in the current frame | Fraction of texture bits up to the current block | Next frame/block includes a complexity activity (motion-related)? |
| Average QP of the previous block row | Fraction of skip blocks processed in the current frame | Fraction of miscellaneous bits up to the current block | Residual Frame Info. |
| QP of the same type of previous block | — | Percentage of processed frame | Motion Estimation |

In these embodiments, the sub-frame ML model 128 is a sub-frame machine learning model that has been pre-trained by the video encoding device 102B, as will be discussed in more detail with reference to FIG. 6, which is also applicable to training a sub-frame machine learning model. As discussed, the sub-frame ML model 128 may be an RL machine learning model. In at least some embodiments, the sub-frame ML model 128 generates an output value using states that depend on the sub-frame statistics 239 and weights that are based on the model parameters 244. In these embodiments, QP decider 219B generates a second QP value for the current sub-frame based on the output value from the sub-frame ML model 128. The controller 122 can then provide the second QP value to the video encoder 132 for rate control of the sub-frame encoding of the current sub-frame. In some embodiments, the sub-frame ML rate controller 228 updates the states of the sub-frame ML model 128 based on at least one of the total bits of encoding, a target bitrate, or a current group of pictures (GOP) of the video content. In these embodiments, the video encoder 132 encodes the current sub-frame using the second QP value.

Figure 2B:
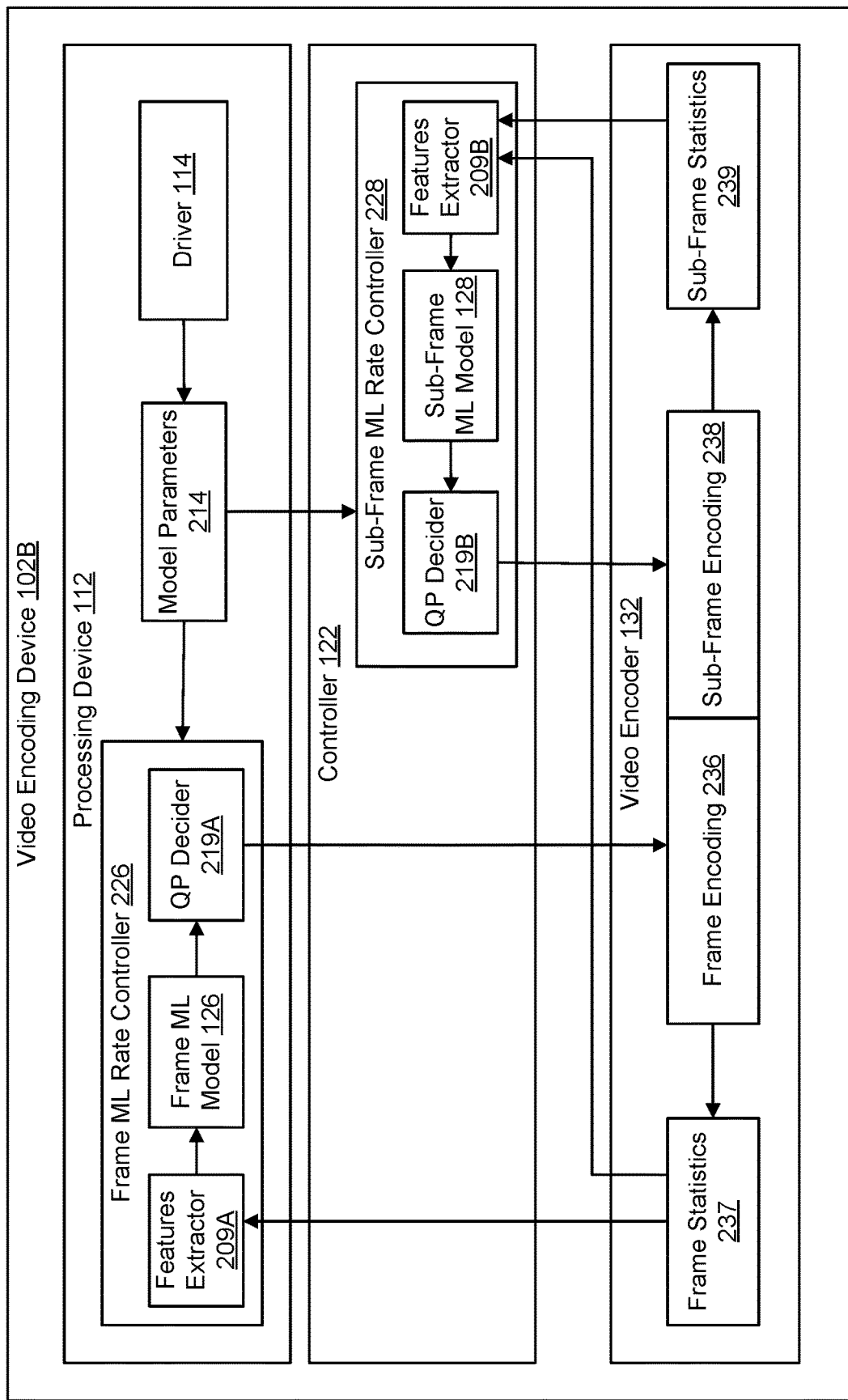
FIG. 2B is a block diagram of a video encoding device of the video encoding sub-system in accordance with at least another embodiment.

FIG. 2B is a block diagram of the video encoding device 102 of the video encoding sub-system 101 in accordance with at least another embodiment. In this embodiment, the frame ML rate controller 226 is instead implemented by the processing device 112, e.g., via execution of instructions (e.g., instructions 142 stored in the memory 140). For example, the processing device 112 can be configured or programmed to receive, from the video encoder 132 during the encoding of video content, frame statistics based on one or more encoded frames of the video content corresponding to a current frame. The processing device 112 can then generate the first QP value for the current frame using a frame machine learning model (such as a pre-trained RL machine learning model), where the frame machine learning model includes states that depend on the frame statistics. The processing device 112 can provide the first QP value to the video encoder 132 for rate control of the frame encoding of the current frame and stream encoded video of the video content from the video encoder 132 over the network 115. In the embodiment of FIG. 2B, the sub-frame ML rate controller 228, as previously described with reference to FIG. 2A.

Figure 3:
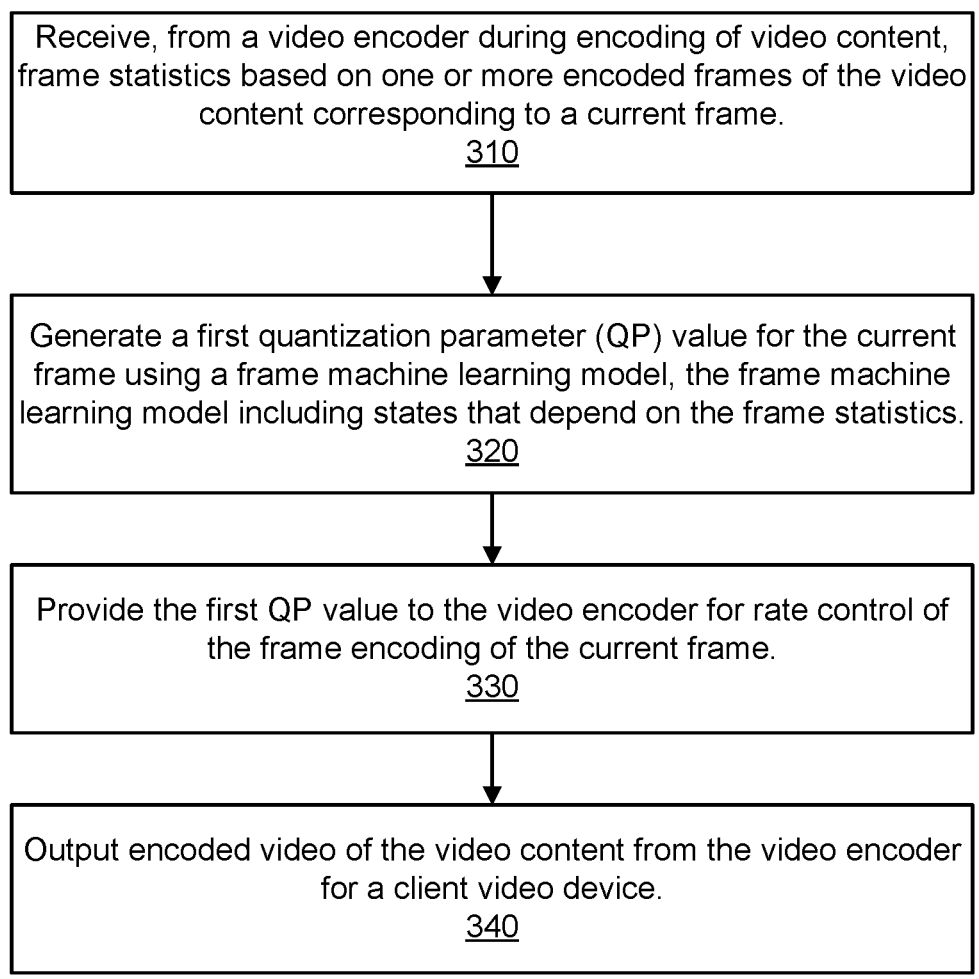
FIG. 3 is a flow diagram of a method for employing a frame (or sub-frame) machine learning model that has been trained to determine a QP value to be used by a video encoder for a current frame (or sub-frame) in accordance with some embodiments.

FIG. 3 is a flow diagram of a method 300 for employing a frame (or sub-frame) machine learning model that has been trained to determine a QP value to be used by a video encoder for a current frame (or sub-frame) in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments related to a frame, the method 300 is performed by the frame ML rate controller 226 of FIGS. 1A-1B. In some embodiments related to a sub-frame, the method 300 is performed by the sub-frame ML rate controller 228 of FIGS. 1A-1B.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives, from the video encoder 132 during the encoding of video content, frame statistics based on one or more encoded frames of the video content corresponding to a current frame. Operation 310 may also be performed for a sub-frame using sub-frame statistics.

At operation 320, the processing logic generates a first quantization parameter (QP) value for the current frame using a frame machine learning model, wherein the frame machine learning model comprises states that depend on the frame statistics. Operation 320 can also be performed to generate a second QP value for a sub-frame using a sub-frame machine learning model.

At operation 330, the processing logic provides the first QP value to the video encoder 132 for rate control of the frame encoding of the current frame. Operation 330 may also be performed to provide the second QP value to the video encoder for rate control of the sub-frame encoding of the current sub-frame.

At operation 340, the processing logic outputs encoded video of the video content from the video encoder 132 for a client video device 50. In some embodiments, the video content is stored in the memory 140 for later availability. In other embodiments, the encoded video is directly provided to the client video device 50 or streamed to the client video device 50 over the network 115.

Figure 4:
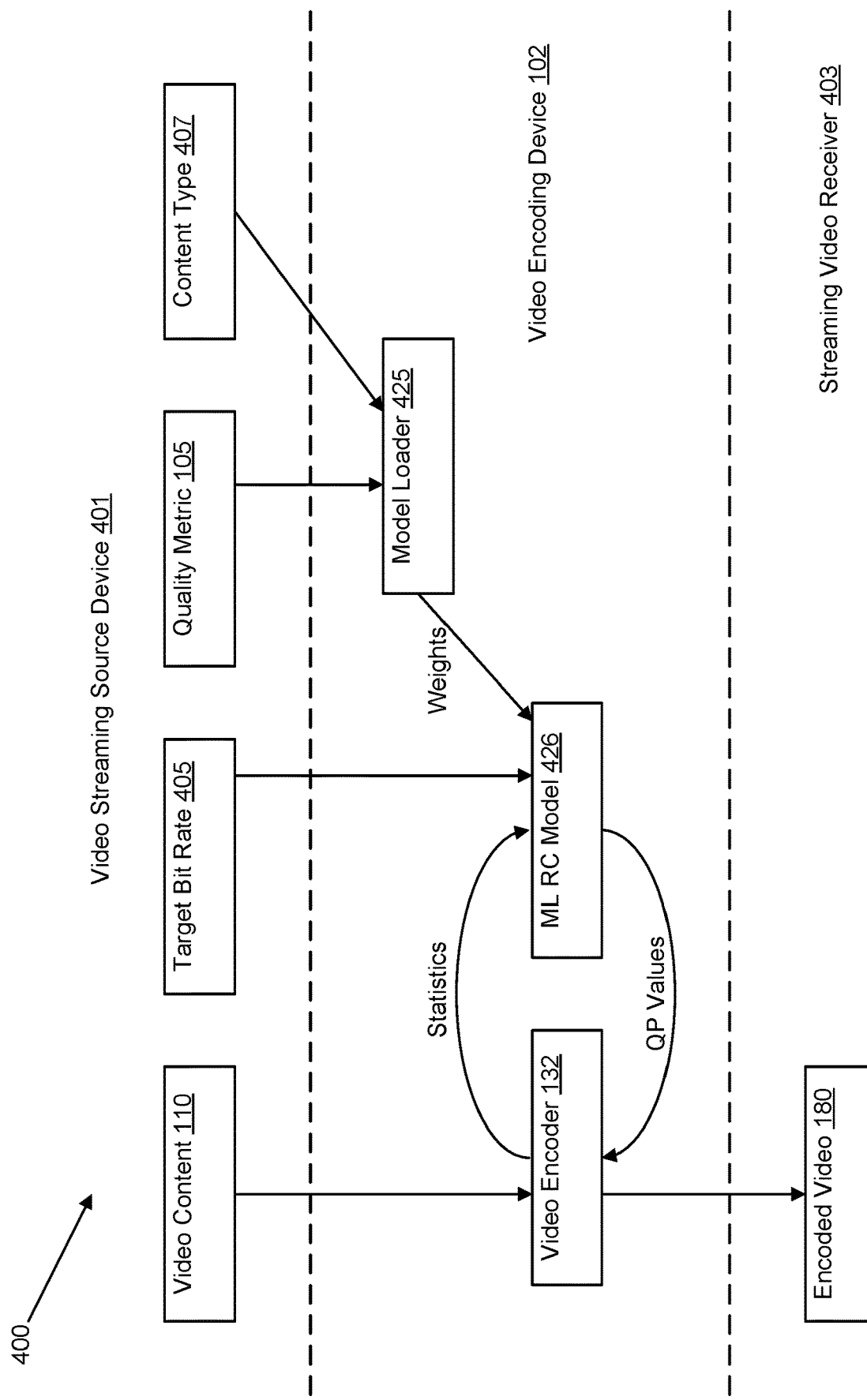
FIG. 4 is a modified flow and architectural diagram illustrating a video encoding pipeline that includes a video encoding device employing a machine learning RC model, in accordance with some embodiments.

FIG. 4 is a modified flow and architectural diagram illustrating a video encoding pipeline 400 that includes a video encoding device 102 (FIG. 1) employing a machine learning RC model, in accordance with some embodiments. For example, in at least some embodiments, the video encoding pipeline 400 includes a video streaming source device 401, the video encoding device 102, and a streaming video receiver 403.

In these embodiments, the encoding pipeline 400 within the video streaming source device 401 provides, to the video encoding device 102, the video content 110, a target bit rate 405, a quality metric 105 (also referred to as a distortion metric), and a content type 407, which were generally discussed in detail with reference to FIG. 1.

In at least some embodiments, the video encoding device 102 performs an encoding loop using this data and information that feeds into generating a QP value for encoding each frame (or sub-frame) in a block or sub-block of video, e.g., before outputting the encoded video 180 to be streamed over the network 115 to the streaming video receiver 403. Although frame encoding may primarily be referenced with respect to FIG. 4, the encoding loop can also be performed for encoding sub-frames, as previously discussed. In various embodiments, the driver 114 of the video encoding device 102 includes an interface that receives this data and information from the network device 90, for example, and pushes this data and information to the appropriate processing logic of the video encoding device 102.

For example, in at least some embodiments, the driver 114 forwards the video content to the video encoder 132, which begins encoding first frames (or sub-frames) of the video content, e.g., in order to generate statistics related to that initial encoding. The driver 114 can further provide the target bit rate 405 to a machine learning RC model 426 (whether of a frame type or a sub-frame type). In some embodiments, the target bit rate 405 is attached (or assigned) to a specific ML model based on the type of video content 110. In other embodiments, the target bit rate 405 can be attached to a specific (e.g., refined) ML model according to a video application (e.g., gaming, user-generated content, studio-generated content, and the like) of the video streaming source device 401, e.g., as an input to the video application. In some embodiments, the video application is based on one of the client video devices 50 incorporating the streaming video receiver 403 to which the encoded video 180 is being streamed. In at least some embodiments, the target bit rate 405 changes during video encoding, e.g., via receipt of an updated input from a network or client video device, and is changed adaptively. If the target bitrate 405 changes, the machine learning RC model 426 can also be changed or adapted accordingly.

In various embodiments, the driver 114 may also include (or be coupled with) a model loader 425 that is configured to generate the model parameters 214 discussed previously, e.g., based on the video encoding to be performed on the video content, which can depend at least in part on the quality metric 105, the content type 407, and/or the target bit rate 405.

In these embodiments, the model loader 425 may further retrieve weights (e.g., from the weights 148 stored in the memory 140) that are based on these model parameters and provide the weights to the machine learning RC model 426. The video encoding device 102 may have already trained the machine learning RC model 426 based on different types or mixes of these model parameters depending on the quality metric 105, the content type 407, and the target bit rate 405. The model loader 425 provides these weights to the machine learning RC model 426 or otherwise configures the machine learning RC model 426 with these weights before the video encoder 132 begins encoding the video content 110. In some embodiments, the weights for the same video content differ between encoding frames versus encoding sub-frames, thus the model loader 425 may configure at least two different machine learning RC models 426 with different weights, depending on whether frames or sub-frames are being encoded by the video encoder.

In this way, the machine learning RC model 426 can be customized and already closer to having the correct states in response to the incoming parameters, including the quality metric 105, the content type 407, and the target bit rate 405. As previously discussed, the machine learning RC model 426 can be generated by training one or more neural networks as a reinforcement learning (RL) model that includes one or more states that are updated based on maximizing a reward function (see FIGS. 5A-5B).

Thus, in at least some embodiments, the weights will impact what QP value is generated for each frame (or sub-frame). The video encoder 132 will employ that QP value generated for the current frame, which in turn generates additional (e.g., updated) statistics that are provided back to the machine learning RC model 426. The video encoding device 102 may then generate a new QP value for the next current frame based on the updated statistical values received from the video encoder 132. As discussed in relation to FIGS. 2A-2B, the frame ML rate controller 226 may perform the function of processing frame statistics to generate QP values for frames. Further, the sub-frame rate controller 228 may perform the function of processing sub-frame statistics to generate QP values for sub-frames. These QP values are generated based on a pre-trained, optimized machine learning RC model, and thus more quickly converge on optimized encoding by the video encoder 132 in different contexts of incoming parameters for different types of video content, quality metrics, and/or bit rates.

Figure 5A:
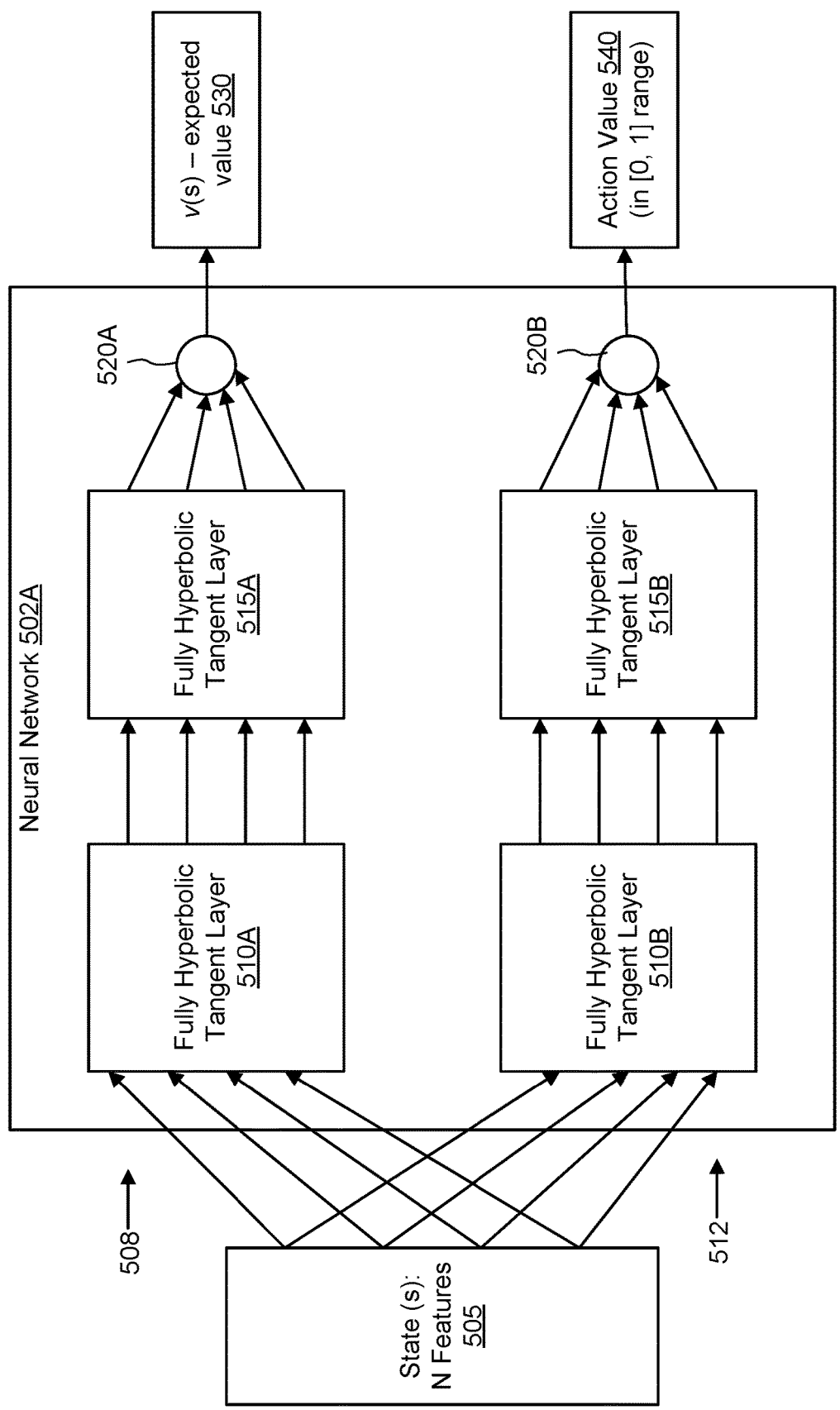
FIG. 5A is a block diagram of a neural network used to implement the frame (or sub-frame) machine learning model, in accordance with some embodiments.

FIG. 5A is a block diagram of a neural network 502A used to implement the frame (or sub-frame) machine learning model, in accordance with some embodiments. In some embodiments, the neural network 502A is a deep neural network (DNN). In at least some embodiments, the neural network 502A receives states 505 for a number (e.g., N) features, which can be generated by the processing device 112 or the controller 122, as previously discussed. In embodiments, the states depend on the frame statistics for a frame machine learning model or sub-frame statistics for a sub-frame machine learning model. The video encoding device 102 can further update the states based on at least one of the total bits of encoding, a target bitrate, a current group of pictures (GOP) of the video content, or the like.

In at least some embodiments, the neural network 502A includes a training path 508 that includes a first fully hyperbolic tangent sigmoid layer 510A, followed by a second fully hyperbolic tangent sigmoid layer 515A, followed by a summer 520A, which outputs an expected value 520, e.g., of a value function v(s) instantiated by the neural network 502A. The output size of the expected value 520 can vary, such as 32 bits, 64 bits, 128 bits, or the like, and be used for feedback in relation to training the neural network 502A, which ultimately generates the original weights that are later used to configure the neural network 502A for real-time operation.

In at least some embodiments, the neural network 502A includes a real-time operational path 512 that includes one or more fully hyperbolic tangent sigmoid layers, e.g., a third fully hyperbolic tangent sigmoid layer 510B followed by a fourth fully hyperbolic tangent sigmoid layer 515B followed by a summer 520B. An output of the real-time operational path (e.g., from the summer 520B) may be an action value 540 in the range of zero to one, e.g., [0, 1]. A QP decider coupled with the neural network 502A can generate the QP value for the current frame (or sub-frame) based on the action value 540. For example, the video encoding device 102 can uniformly quantize the action value into a QP value, e.g., which can be done via quantized normalization or the like. In some embodiments, as was discussed, the video encoding device 102 can retrieve the weights determined when training the neural network 502A through the training path 508. The video encoding device 102 can then configure the third and fourth fully hyperbolic tangent sigmoid layers 510B and 515B with the retrieved weights in advance of using the trained neural network 502A in real-time operational path 512.

In embodiments, reinforcement learning refers to goal-oriented algorithms, which learn how to achieve a complex objective (or goal) or how to maximize along a particular dimension over many operations. For example, the algorithms can maximize the points won in a game over many moves or related to this disclosure, can maximize a trade-off (or balance) between a quality metric and a bitrate deviation in video encoding. Reinforcement learning algorithms can start from a blank slate and, under the right conditions, achieve exceptional performance. Reinforcement learning algorithms can further be configured with starting states and employ particular weights so RL learning algorithms do not have to start learning (with feedback rewards) from scratch. Like a pet incentivized by scolding and treats, RL algorithms are penalized when the RL learning algorithms make the wrong decisions and rewarded when the RL learning algorithms make the right ones: this is reinforcement. An agent, such as may be implemented by the processing device 112 and/or the controller 122, may perform RL tuning of the state values in a feedback loop of repetitive actions (here, the encoding of frames or sub-frames) until reaching a particular steady state of maximization of the reward function before outputting, e.g., the action value 540 or a QP value itself.

In some embodiments, the neural network 502A implements an RL machine learning model that maximizes a reward function associated with the neural network 502A while encoding multiple frames of the video content, e.g., a cumulated reward value over the multiple frames. In some examples, the multiple frames are a predetermined number of frames, such as 50, 80, 100, or more frames at a time. For example, in at least one embodiment, maximizing the reward function minimizes bitrate deviation while maximizing a quality metric of the frame (or sub-frame) encoding. Once a cumulated reward value is reached for the multiple frames, the video encoding device 102 can output the encoded (or compressed) video frames as part of the video streaming across the network 115 (see FIG. 1).

Reinforcement learning (RL) functions may be generated in many different formats and are typically not rigidly defined so long as the RL functions provide some reward or penalty depending on feedback changes to states responsive to iterative actions that are performed. For example, an RL function (or algorithm) may generally be expressed R(s, a) or R(s, a, s'), e.g., based on a state (s) and action (a) or based on state (s), action (a), and updated state (s'). Additional variables may be integrated into reward functions depending on the complexity of the problem and/or a trade-off of available processing power for performing RL training and/or the use of a trained RL function.

As just one example, for purposes of explanation in this disclosure, the reward function may be expressed as follows:

$$r(t) = (1 - \alpha_t) \cdot [\text{RateScore}(\text{rate}_{Target}, \text{size}_{frames}) + \lambda_t \cdot \text{QualityScore}(\text{quality}_{frames})] + \alpha_t \cdot \text{ImitationScore}(QP_{native}, QP_{agent})$$

where t is time during training $\alpha_t$ is an imitation trade-off parameter (can be scheduled and changed across time), $\lambda_t$ is a rate-distortion trade-off parameter (can be scheduled and changed across time). Further, in a rate portion of the reward function, $\text{rate}_{Target}$ is the target bitrate of current encoding, $\text{size}_{frames}$ lists frame sizes of current encoding, and RateScore is a function that gives a high score for accurate bitrate (e.g., close to the target). Additionally, in a quality portion of the reward function, $\text{quality}_{frames}$ is a list of encoded-frames qualities (e.g., PSNR) of current encoding, and QualityScore is a function that gives a higher score for higher quality frames. Finally, in an imitation portion of the reward function, $QP_{native}$ is a QP value as decided by the native rate-control algorithm in the encoder (i.e., not the disclosed algorithm), $QP_{agent}$ is the QP the disclosed RL agent recommended, and ImitationScore is a function that gives a higher score for QP values closer to target QP values.

With reference to the above reward function, below are two further examples of reward functions, the first without imitation and the second only with imitation, provided only by way of example for purposes of explanation.

1. With no imitation ($\alpha$=0) and fixed $\lambda$=0.1, the reward function may be expressed as $$r(t) = -\left|\log \frac{\text{rate}_{Target}}{\text{Average }(\text{size}_{frames})}\right| + 0.1 \cdot \min PSNR_{frames}.$$

2. With only imitation ($\alpha$=1), the reward function may be expressed as $$r(t) = |QP_{native} - QP_{agent}|.$$

Figure 5B:
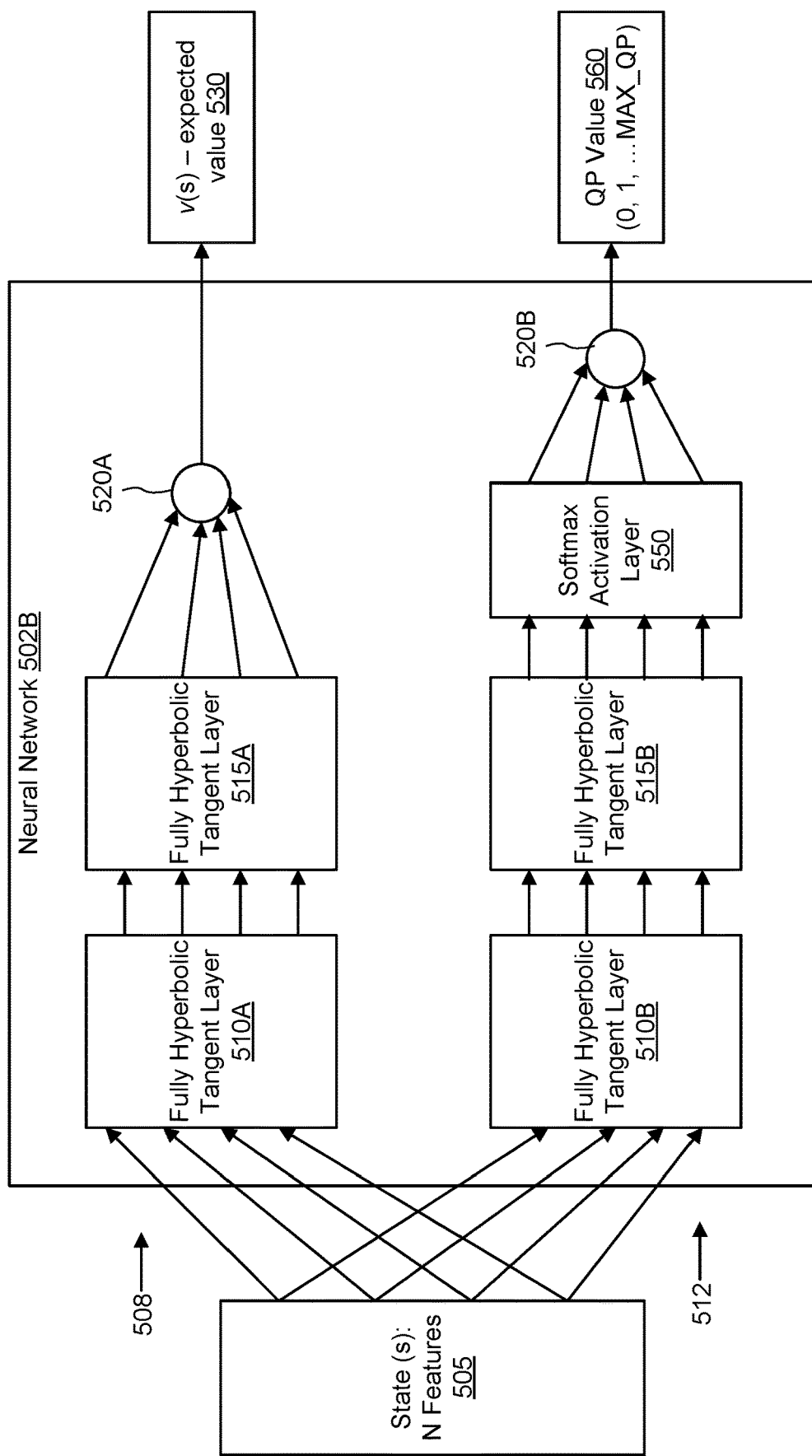
FIG. 5B is a block diagram of a neural network used to implement the frame (or sub-frame) machine learning model, in accordance with other embodiments.

FIG. 5B is a block diagram of a neural network 502B used to implement the frame (or sub-frame) machine learning model, in accordance with other embodiments. In some embodiments, the neural network 502B is a deep neural network (DNN). The neural network 502B may be very similar to the neural network 502A (FIG. 5B), except the one or more fully hyperbolic tangent sigmoid layers 510B and 515B are followed by a softmax activation layer 550, the outputs of which are summed by the summer 520B to generate a QP value 560. Thus, the neural network 502B may be completely configured to generate the QP value to be provided to the video encoder for rate control of frame (or sub-frame) encoding. In other words, the neural network 502B is learning to optimize the QP values output from the neural network 502B, so the quantization is integrated within the softmax activation layer. In some embodiments, the softmax activation layer 550 takes the inputs from the last fully hyperbolic tangent layer 515B, determines the maximum value of these inputs, and outputs that value as the QP value 560.

In at least some embodiments, there exist one or more differences between a frame and sub-frame architecture of the neural networks 502A or 502B. For example, in various embodiments, the varying NNs (or DNNs) may work on different inputs, e.g., the states may be different. Further, the number of layers or nodes and the types of activation functions may vary. Further, the output of the NNs (or DNNs) may differ, e.g., it may give a delta-QP value output (a difference from a previous QP value or output a bit budget or other quantitatively different value that nonetheless still adjusts rate control of the video encoding.

Figure 6:
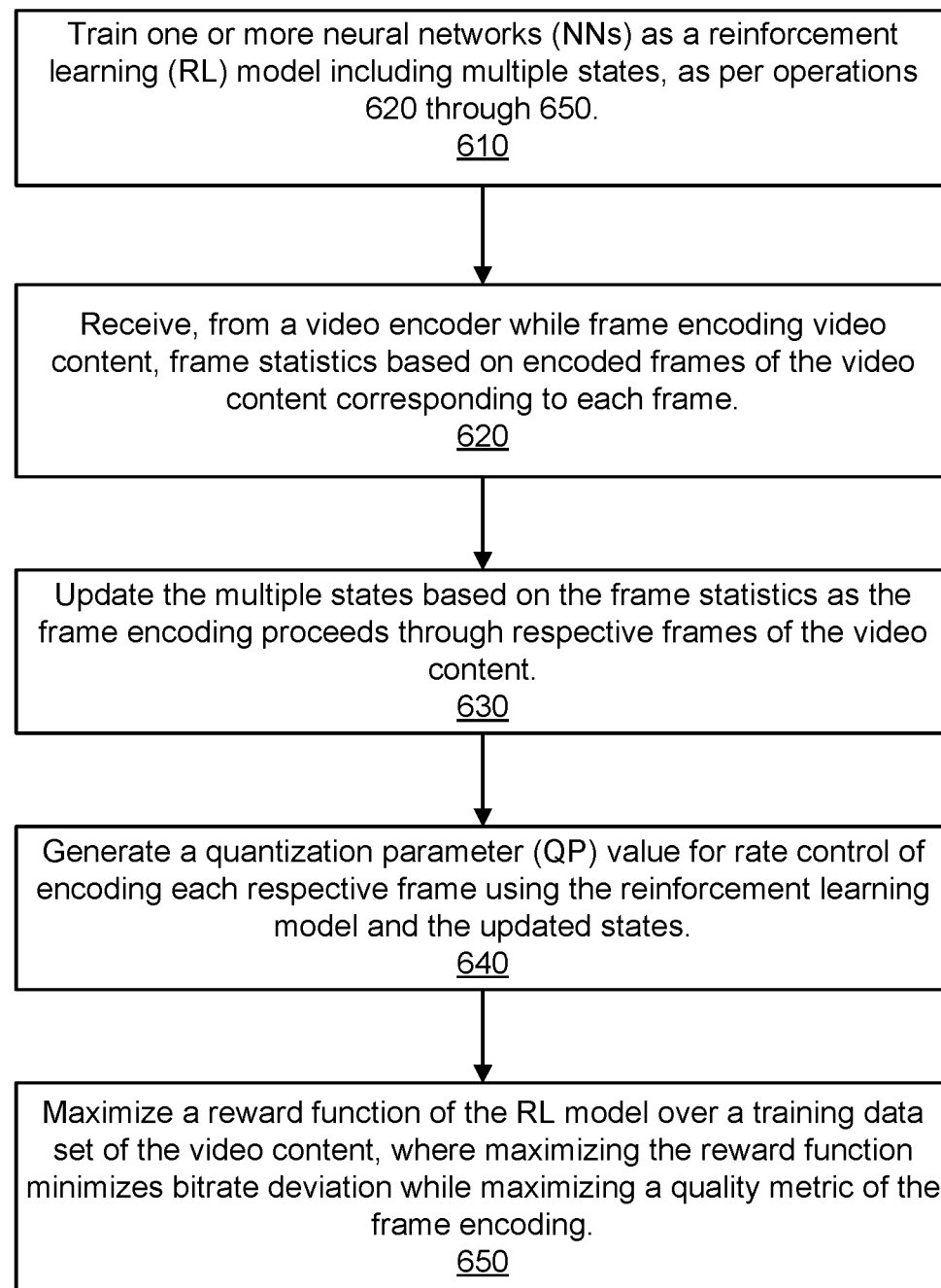
FIG. 6 is a flow diagram illustrating a method for training one or more neural networks as a reinforcement training model for use in the disclosed video encoding, in accordance with some embodiments.

FIG. 6 is a flow diagram illustrating a method 600 for training one or more neural networks as a reinforcement training model for use in the disclosed video encoding, in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments related to a frame, the method 600 is performed by the processing device 112 and/or the controller 122 of FIGS. 1A-1B. For example, in some embodiments, the training is performed using one or more computers having one or more processors. The method 600 may be disclosed and discussed in relation to neural networks 502A and 502B just discussed with reference to FIGS. 5A-5B.

At operation 610, the processing logic trains one or more neural networks as a reinforcement learning model having multiple states, as per operations 620 through 650.

At operation 620, the processing logic receives, from a video encoder during frame encoding of video content, frame statistics based on encoded frames of the video content corresponding to each frame.

At operation 630, the processing logic updates the multiple states based on the frame statistics as the frame encoding proceeds through the respective frames of the video content.

At operation 640, the processing logic generates a quantization parameter (QP) value for rate control of encoding each respective frame using the reinforcement learning model and the updated multiple states.

At operation 650, the processing logic maximizes a reward function of the reinforcement learning model over a training data set of the video content. In embodiments, maximizing the reward function minimizes bitrate deviation while maximizing a quality metric of the frame encoding. In some embodiments, the reward function causes imitation learning to be performed relative to a known reinforcement learning model or, in the alternative, causes improvement learning to be performed that outperforms the known reinforcement learning model. In this way, the disclosed training of the RL model may be an improvement over current RL models.

With additional reference to FIG. 6, in some embodiments, maximizing the reward function includes the following operations. The processing logic may generate multiple model parameters based on at least one of a type of the video content or the quality metric. The processing logic may generate multiple weights for the one or more neural networks based on the multiple parameters. The video encoding device 102 may update the multiple weights in order to maximize the reward function.

Additionally, during training, the processing logic can generate an action value for each frame using the reinforcement learning model and then generate a respective QP value for each frame based on a corresponding action value. Further, the processing logic, to generate each QP value, the one or more neural networks include one or more fully hyperbolic tangent sigmoid layers followed by a softmax activation layer and a summer that outputs each respective QP value.

FIG. 7 is a flow diagram illustrating a method 700 for optimizing rate control through the disclosed machine learning models regardless of a quality metric selected by a video streaming source device in accordance with some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments related to encoding frames, the method 700 is performed by the frame ML rate controller 226 of FIGS. 1A-1B. In some embodiments related to encoding sub-frames, the method 700 is performed by the sub-frame ML rate controller 228 of FIGS. 1A-1B.

At operation 710, the processing logic receives video content, a quality metric, and a target bit rate for encoding the video content. In some embodiments, the quality metric is a video quality assessment metric (such as previously discussed), and the target bit rate is one of a a predefined bit rate, a constant bit rate, or a variable bit rate. In various embodiments, the quality metric 105 may be one or a combination of Peak Signal-to-Noise Ratio (PSNR), Extended Perceptually Weighted Peak SNR (XPSNR), Structural Similarity Index Measure (SSIM), which is distorted by scaling and compression, and Video Multimethod Assessment Fusion (VMAF). The quality metric 105 may also be used to rate or be associated with a type of codec used by the video encoder 132, e.g., HEVC, AV1, H264 (also known as MPEG-4 or Advance Video Coding), or VP9, which are listed by way of example and is not meant to be limiting.

At operation 720, the processing logic generates first QP values on a per-frame basis using a frame machine learning model with a first plurality of weights. The first plurality of weights may depend, at least in part, on the quality metric and the target bit rate, for example. In some embodiments, the frame machine learning model is a frame reinforcement learning model that is instantiated in a neural network. In embodiments, the neural network uses the first plurality of weights to maximize a reward function of the neural network while encoding a plurality of frames of the video content.

At operation 730, the processing logic provides the first QP values to encoding hardware for rate control of frame encoding by the encoding hardware. In some embodiments, the encoding hardware 134 encodes each respective frame using a respective one of the first QP values. In some embodiments, the processing logic further retrieves a plurality of parameters related to the quality metric and provides the plurality of parameters to the controller 122. In these embodiments, the machine instructions are executable to select the first plurality of weights corresponding to the plurality of parameters. In the embodiment of FIG. 2A, operations 720 and 730 may be performed by the controller 122, whereas in the embodiment of FIG. 2B, operations 720 and 730 may be performed by the processing device.

At operation 740, the processing logic optionally generates second QP values on a per-sub-frame basis using a sub-frame machine learning model with a second plurality of weights. In some embodiments, the second plurality of weights depends, at least in part, on the quality metric and the target bit rate.

At operation 750, the processing logic optionally provides the second QP values to the encoding hardware for use in rate control when encoding respective sub-frames of the video content. In some embodiments, the encoding hardware 134 encodes each respective sub-frame using a respective one of the second QP values. In the embodiments of FIGS. 2A-2B, operations 740 and 750 may both be performed by the controller 122.

Figure 8:
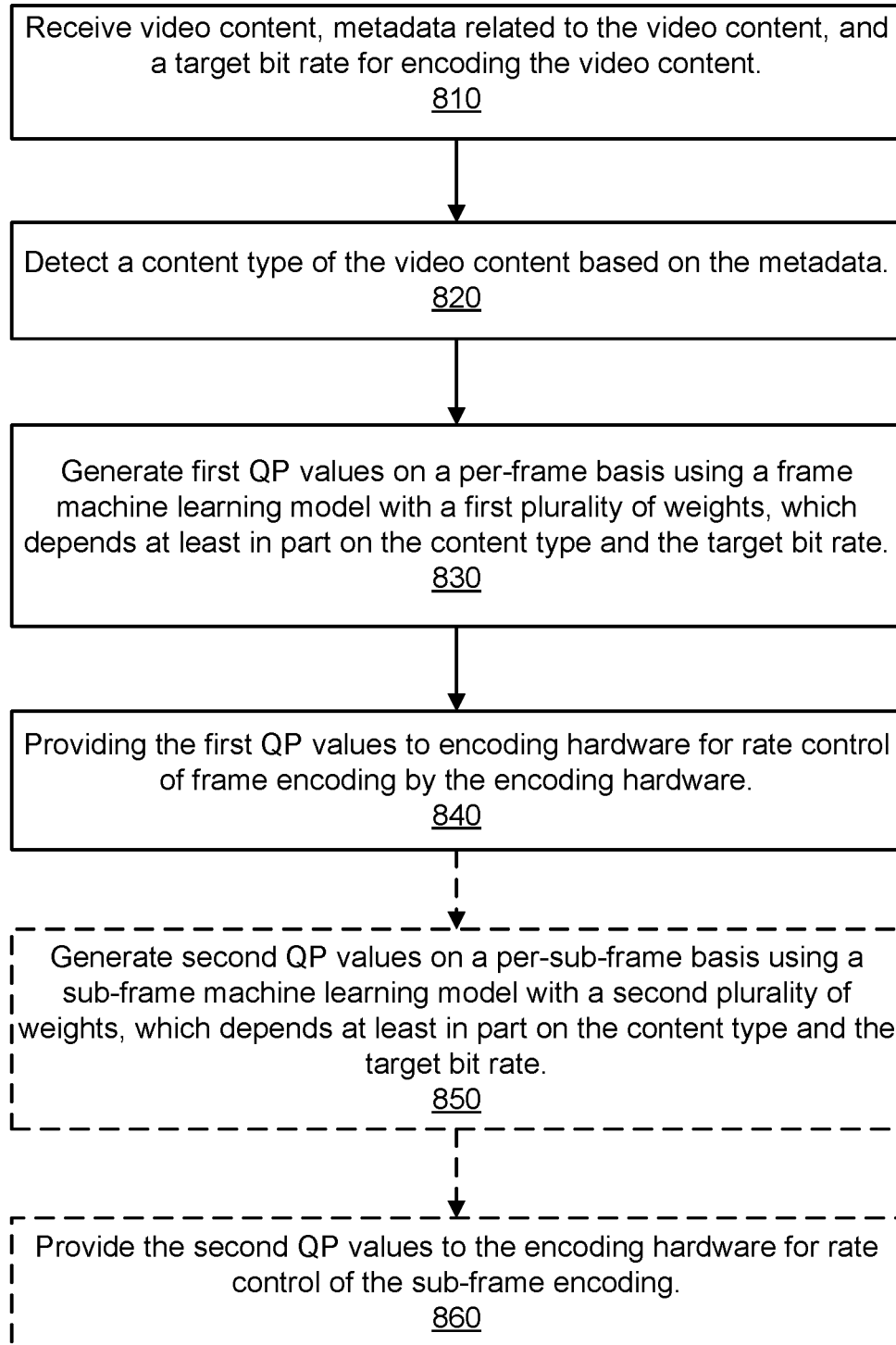
FIG. 8 is a flow diagram of a method for optimizing rate control through the disclosed machine learning models depending on a content type of the video being encoded, in accordance with some embodiments.

FIG. 8 is a flow diagram of a method for optimizing rate control through the disclosed machine learning models depending on a content type of the video being encoded, in accordance with some embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments related to encoding frames, the method 800 is performed by the frame ML rate controller 226 of FIGS. 1A-1B. In some embodiments related to encoding sub-frames, the method 800 is performed by the sub-frame ML rate controller 228 of FIGS. 1A-1B.

At operation 810, the processing logic receives video content, metadata related to the video content, and a target bit rate for encoding the video content. In embodiments, the metadata includes one or more tags associated with the video content, e.g., indicative of the type of video content.

At operation 820, the processing logic detects a content type of the video content based on the metadata. For example, the processing logic can detect the one or more tags that are indicative of the content type, e.g., by accessing a lookup table or the like to correlate the content type to particular tag(s).

At operation 830, the processing logic generates first QP values on a per-frame basis using a frame machine learning model with a first plurality of weights. In embodiments, the first plurality of weights depends, at least in part, on the content type and the target bit rate. In some embodiments, the frame machine learning model is a frame reinforcement learning model that is instantiated in a neural network. In embodiments, the neural network uses the first plurality of weights to maximize a reward function of the neural network while encoding a plurality of frames of the video content.

At operation 840, the processing logic provides the first QP values to the encoding hardware 134 for rate control of frame encoding by the encoding hardware 134. In some embodiments, the encoding hardware 134 encodes each respective frame using a respective one of the first QP values. In some embodiments, the processing logic further retrieves a plurality of parameters related to the detected content type and provides the plurality of parameters to the controller. In these embodiments, the machine instructions are executable to select the first plurality of weights corresponding to the plurality of parameters. In the embodiment of FIG. 2A, operations 830 and 840 may be performed by the controller 122, whereas in the embodiment of FIG. 2B, operations 830 and 840 may be performed by the processing device 112.

At operation 850, the processing logic optionally generates second QP values on a per-sub-frame basis using a sub-frame machine learning model with a second plurality of weights. In embodiments, the second plurality of weights depends, at least in part, on the content type and the target bit rate.

At operation 860, the processing logic optionally provides the second QP values to the encoding hardware 134 for rate control of the sub-frame encoding. In some embodiments, the encoding hardware 134 encodes each respective sub-frame using a respective one of the second QP values. In the embodiments of FIGS. 2A-2B, operations 850 and 860 may both be performed by the controller 122.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof)

is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device, a NIC, or an accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A system comprising:
    a processing device to:
        receive video content, metadata related to the video content, and a target bit rate for encoding the video content; and
        detect a content type of the video content based on one or more tags within the metadata, wherein the one or more tags are indicative of the content type received from a particular video streaming source device;
    encoding hardware to perform frame encoding on the video content and to generate frame statistics based on one or more encoded frames of the video content corresponding to a current frame; and
    a controller coupled between the processing device and the encoding hardware, the controller programmed with machine instructions to:
        receive the frame statistics from the encoding hardware;
        generate a first quantization parameter (QP) value of the current frame using a frame machine learning model with a first plurality of weights, wherein the first plurality of weights depends at least in part on the content type, the target bit rate, and the frame statistics; and
        provide the first QP value directly to the encoding hardware for rate control of the frame encoding.

2. The system of claim 1, wherein the statistics include one or more of block-related metadata, frame-related metadata, bit budget information, or complexity motion information.

3. The system of claim 1, wherein corresponding to the current frame comprises one of being adjacent, neighboring frames, frames within a same block, or frames within a same sub-block of the video content.

4. The system of claim 1, wherein the processing device is further to:
    retrieve a plurality of parameters related to the detected content type; and
    provide the plurality of parameters to the controller; and
    wherein the machine instructions are further to select the first plurality of weights corresponding to the plurality of parameters.

5. The system of claim 1, wherein the machine learning model is a frame reinforcement learning model that is instantiated in a neural network, wherein the neural network uses the first plurality of weights to maximize a reward function of the neural network while encoding a plurality of frames of the video content.

6. The system of claim 1, wherein the encoding hardware is further to perform sub-frame encoding and generate sub-frame statistics, and the machine instructions are further to:
    generate a second QP value of a current sub-frame using a sub-frame machine learning model with a second plurality of weights, wherein the second plurality of weights depends at least in part on the content type, the target bit rate, and the sub-frame statistics; and
    provide the second QP value to the encoding hardware for rate control of the sub-frame encoding.

7. The system of claim 6, wherein the encoding hardware is further to encode each respective sub-frame of a plurality of sub-frames using a respective one of a plurality of second QP values.

8. An integrated circuit comprising:
    encoding hardware to perform frame encoding on video content and to generate frame statistics based on one or more encoded frames of the video content corresponding to a current frame; and
    a processing device coupled to encoding hardware, wherein the processing device is to implement, using program code, a frame machine learning rate controller that is to:
        receive the video content, metadata related to the video content, a target bit rate, and the frame statistics for encoding the video content;
        detect a content type of the video content based on one or more tags within the metadata, wherein the one or more tags are indicative of the content type received from a particular video streaming source device;
        generate a first quantization parameter (QP) value of the current frame using a frame machine learning model with a first plurality of weights, wherein the first plurality of weights depends at least in part on the content type, the target bit rate, and the frame statistics; and
        provide the first QP value directly to the encoding hardware for rate control of the frame encoding.

9. The integrated circuit of claim 8, wherein the frame statistics include one or more of block-related metadata, frame-related metadata, bit budget information, or complexity motion information.

10. The integrated circuit of claim 8, wherein corresponding to the current frame comprises one of being adjacent, neighboring frames, frames within a same block, or frames within a same sub-block of the video content.

11. The integrated circuit of claim 8, wherein the processing device is further to:
    retrieve a plurality of parameters related to the detected content type; and
    select the first plurality of weights corresponding to the plurality of parameters.

12. The integrated circuit of claim 8, wherein the machine learning model is a frame reinforcement learning model that is instantiated in a neural network, wherein the neural network uses the first plurality of weights to maximize a reward function of the neural network while encoding a plurality of frames of the video content.

13. The integrated circuit of claim 8, wherein the encoding hardware is further to perform sub-frame encoding and generate sub-frame statistics, further comprising a controller coupled to the processing device and to execute machine instructions to:
    generate a second QP value on of a current sub-frame using a sub-frame machine learning model with a second plurality of weights, wherein the second plurality of weights depends at least in part on the content type, the target bit rate, and the sub-frame statistics; and
    provide the second QP value to the encoding hardware for rate control of the sub-frame encoding.

14. The integrated circuit of claim 8, wherein the encoding hardware is further to encode each respective sub-frame of a plurality of sub-frames using a respective one of a plurality of second QP values.

15. A method comprising:
    receiving video content, metadata related to the video content, and a target bit rate for encoding the video content;
    receiving, by a processing device, from encoding hardware that performs frame encoding, frame statistics based on one or more encoded frames of the video content corresponding to a current frame;
    detecting a content type of the video content based on one or more tags within the metadata, wherein the one or more tags are indicative of the content type received from a particular video streaming source device;

generating, by the processing device, a first quantization parameter (QP) value of the current frame using a frame machine learning model with a first plurality of weights, wherein the first plurality of weights depends at least in part on the content type, the target bit rate, and the frame statistics; and providing, by the processing device, the first QP value directly to encoding hardware for rate control of frame encoding by the encoding hardware.

16. The method of claim 15, wherein the frame statistics include one or more of block-related metadata, frame-related metadata, bit budget information, or complexity motion information.

17. The method of claim 15, further comprising:
retrieving a plurality of parameters related to the detected content type; and
selecting the first plurality of weights corresponding to the plurality of parameters.

18. The method of claim 15, wherein the machine learning model is a frame reinforcement learning model that is instantiated in a neural network, wherein the neural network uses the first plurality of weights to maximize a reward function of the neural network while encoding a plurality of frames of the video content.

19. The method of claim 15, wherein the encoding hardware is further to perform sub-frame encoding and generate sub-frame statistics, the method further comprising:
generating a second QP value of a current sub-frame using a sub-frame machine learning model with a second plurality of weights, wherein the second plurality of weights depends at least in part on the content type, the target bit rate, and the sub-frame statistics; and
providing the second QP value to the encoding hardware for rate control of the sub-frame encoding.

20. The method of claim 19, further comprising encoding, with the encoding hardware, each respective sub-frame of a plurality of sub-frames using a respective one of a plurality of second QP values.

* * * * *